UNITED STATES PATENT OFFICE.

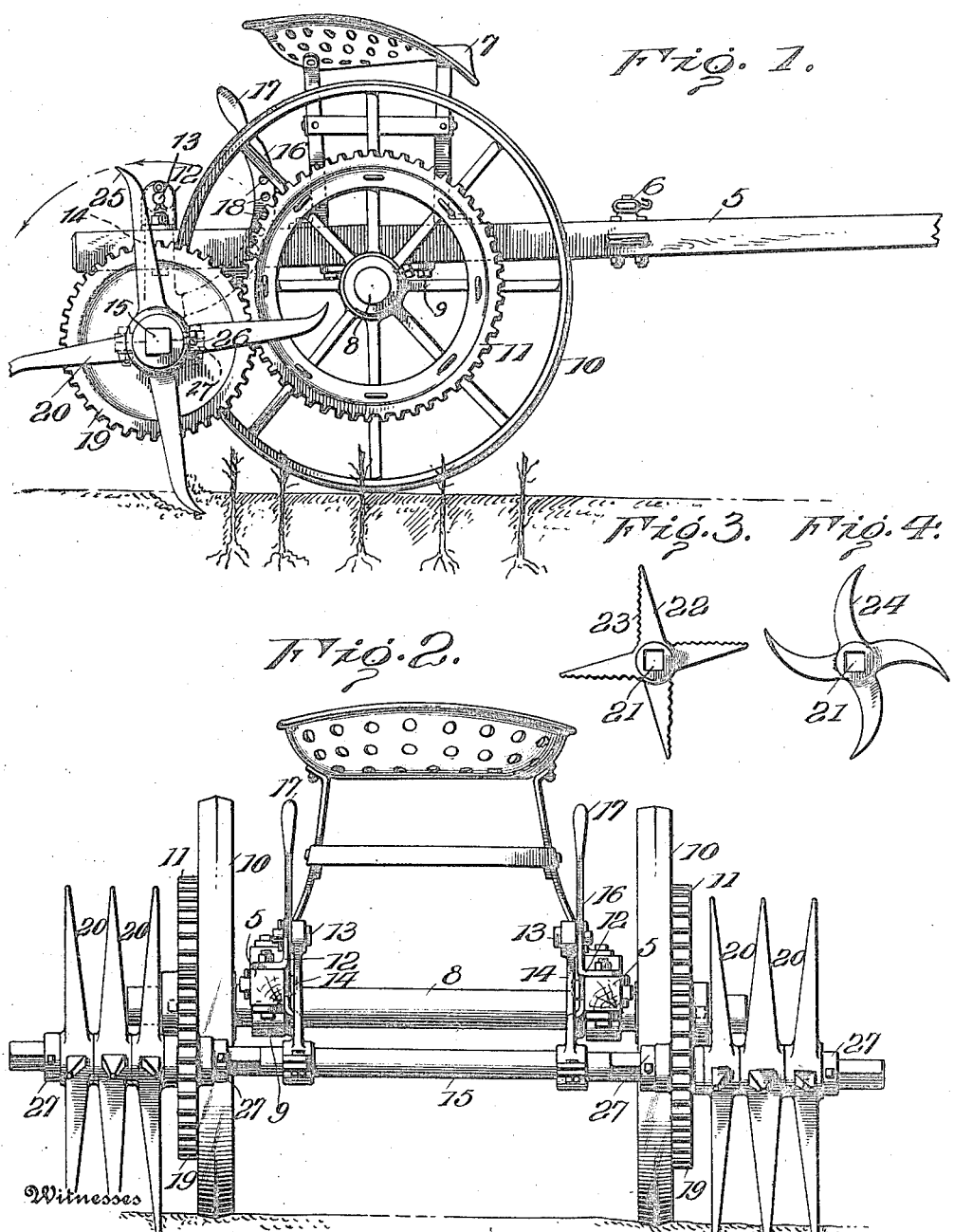

MARK W. MARSDEN, OF PHILADELPHIA, PENNSYLVANIA.

MACHINE FOR PULLING COTTON-PLANTS.

1,248,365. Specification of Letters Patent. Patented Nov. 27, 1917.

Application filed March 23, 1915. Serial No. 16,360.

*To all whom it may concern:*

Be it known that I, MARK W. MARSDEN, a citizen of the United States, residing at Philadelphia, in the county of Philadelphia and State of Pennsylvania, have invented certain new and useful Improvements in Machines for Pulling Cotton-Plants, of which the following is a specification.

The cotton plant, that is to say its stalks, stems and roots, or what remains of the plant after the harvesting or picking, is a source of great value both as regards its extractive matter as well as its vast yield of fiber useful in paper making and in other arts. It is important from an economical viewpoint as well as for the purpose of recovering the staple in a perfect condition that the picked plants be pulled from the soil with the roots intact and with as little bruising as possible, and it is the principal object of my present invention to provide a machine or apparatus of simple and inexpensive construction capable of accomplishing this.

Another object is to provide a machine or apparatus of the character stated adapted and arranged to work upon two rows simultaneously, and wherein provision is made for adjusting the pullers and their operating mechanism so as to adapt them to variously spaced rows of plants.

Another object is to provide a simple form of mechanism for locking and releasing the puller-carrying mechanism in respect to the driving mechanism, and for raising the pullers off the ground when desired.

Another object is to provide an efficient type of puller and a simple mounting for the same whereby sets or groups of pullers of the same or different type may be employed, and may be replaced with ease and despatch in the event of breakage.

With these and other objects in view, the nature, characteristic features and scope of the invention will more readily be understood from the following description taken in connection with the accompanying drawings, forming a part hereof, wherein—

Figure 1 is a side elevational view of a cotton-plant pulling machine or apparatus constructed in accordance with my invention.

Fig. 2 is a rear elevational view of the same.

Figs. 3 and 4 are elevational views of different puller structures.

Referring to Figs. 1 and 2, there is a main frame consisting of shafts 5 equipped with hooks or draft rigging devices 6 and supporting over the axle a driver's seat 7. The axle 8 is mounted in suitable boxings 9 and is adapted to receive the traction wheels 10. The latter are provided with gear wheels 11. Secured to the rear ends of the shafts 5 are L shape supports 12 having pivot pins 13 on which are mounted rocker arms or hangers 14, which constitute bearings for a puller-carrying shaft or axle 15. The hangers are provided with upwardly curved members 16 terminating in handles 17 within easy reach of the driver, whereby the puller shaft may be shifted when it is desired to disengage the gearing or to lift the pullers from the ground. Manifestly any suitable means may be employed to secure the members 16 in the desired position; for example they may be provided with holes 18 to receive a pin or bolt or any other securing member which may for example bear upon the shaft.

The puller shaft 15 has a considerable portion of each end formed square in cross-section to receive the gear wheels 19 and the pullers 20. Evidently the gear wheels 19 mesh with the drivers or gear wheels 11 on the traction wheels and thus tranmit motion to the puller shaft.

The pullers are mounted in sets or groups, the number of units of which may vary, but practice teaches that with the types illustrated, which I find to be the most appropriate, the best results are attained by employing three units in each set. It will be observed upon reference to Figs. 3 and 4, that the puller units are comparatively long bladed generally star shape members having square axle openings 21. Fig. 3 shows a four-pointed puller consisting of tapered radial blades 22 with serrated sides 23. Fig. 4 shows curved blades 24; and Fig. 1 shows straight blades with hook-like terminals 25.

The puller units may be secured by set-screws or keys 26 and the groups, including the gear wheels 19, are locked in place on the shaft by collars 27. It is obvious of course that this arrangement admits of adjusting the parts to enable the pullers or puller groups to operate simultaneously on variously spaced rows of plants.

Having described the nature and objects of the invention I claim:—

1. In a machine of the type recited, the combination of a main frame including traction wheels, a revoluble puller shaft swung from the main frame, groups of pullers mounted at each end of the shaft, and means for effecting adjustments of said pullers collectively as well as individually, substantially as described.

2. In a machine of the type recited, the combination of a main frame including traction wheels, a vertically adjustable puller-carrying frame carried by the main frame, an axle supported by said puller-carrying frame and arranged to be driven by the traction wheels, multi-unit pullers adapted to rotate with said axle, and means for effecting endwise adjustments of said pullers to adapt them to variously spaced rows, substantially as described.

3. In a machine of the type recited, the combination of a main frame including traction wheels equipped with power transmission mechanism, a vertically adjustable puller-carrying frame carried by the main frame and supporting an axle capable of rotation, groups of pullers mounted on and rotating with the axle and capable of adjustment collectively as well as individually to adapt them to variously spaced rows, and an operative connection between the axle and said transmission mechanism, substantially as described.

In testimony whereof I affix my signature in presence of two witnesses.

MARK W. MARSDEN.

Witnesses:
HARRY A. HEGARTY,
JAS. A. RICHMOND.

Copies of this patent may be obtained for five cents each, by addressing the "Commissioner of Patents, Washington, D. C."